US012229211B2

(12) United States Patent
Casadio et al.

(10) Patent No.: US 12,229,211 B2
(45) Date of Patent: Feb. 18, 2025

(54) PROCESS AND SYSTEM FOR AUTOMATIC FORENSIC ACQUISITION OF WEB PAGE CONTENT

(71) Applicant: KOPJRA S.R.L., Bologna (IT)

(72) Inventors: Emanuele Casadio, Russi (IT); Tommaso Grotto, Schio (IT); Luis Perez Sanchez, Bologna (IT); Matteo Scapin, Torrebelvicino (IT)

(73) Assignee: KOPJRA S.R.L., Bologna (IT)

( * ) Notice: Subject to any disclaimer, the term of this patent is extended or adjusted under 35 U.S.C. 154(b) by 0 days.

(21) Appl. No.: 18/317,504

(22) Filed: May 15, 2023

(65) Prior Publication Data

US 2023/0409658 A1 Dec. 21, 2023

(30) Foreign Application Priority Data

May 18, 2022 (IT) .......................... 102022000010355

(51) Int. Cl.
*G06F 16/955* (2019.01)
*G06F 16/906* (2019.01)

(52) U.S. Cl.
CPC ........ *G06F 16/9566* (2019.01); *G06F 16/906* (2019.01)

(58) Field of Classification Search
CPC ... G06F 16/9566; G06F 16/906; G06F 16/986
See application file for complete search history.

(56) References Cited

U.S. PATENT DOCUMENTS

| 2008/0244694 A1 | 10/2008 | Neystadt |
| 2012/0290847 A1 | 11/2012 | O'Connor |
| 2015/0199738 A1* | 7/2015 | Jung ................. G06Q 30/0609 |
| | | 705/26.35 |
| 2022/0253218 A1* | 8/2022 | Balasubramanian ... G06F 3/065 |

(Continued)

OTHER PUBLICATIONS

Kim Hyunmin et al: "AIBFT: Artificial Intelligence Browser Forensic Toolkit", Forensic Science International Digital Investigation, Elsevier, Amsterdam, NL, vol. 36, Nov. 7, 2020 (Nov. 7, 2020), XP086535762, ISSN: 2666-2817, DOI: 10.1016/J.FSIDI.2020.301091 [retrieved on Nov. 7, 2020].

(Continued)

*Primary Examiner* — Richard L Bowen
*Assistant Examiner* — Aryan D Toughiry
(74) *Attorney, Agent, or Firm* — SHUTTLEWORTH & INGERSOLL, PLC; Timothy J. Klima (57) ABSTRACT

Forensic acquisition of contents of web pages accessible through a user device on a network includes communication by the user of URL addresses of indicated web pages useful for preparation of a forensic evidence document to a control and coordination program which executes access to the network by a browser and creates a list of relevant features of the content type of the pages. The program then performs a classification of specific types of contents of the pages based on the relevant features and proceeds to an automatic selective navigation based on the type of classification of the pages. The selective acquisition of the contents is performed by specialized program code depending on the type of classification of the pages. The process includes the automatic creation and return to the user of a forensic evidence document with the contents acquired.

15 Claims, 4 Drawing Sheets

(56) References Cited

U.S. PATENT DOCUMENTS

2023/0153370 A1* 5/2023 Alonichau ............ G06F 16/951
 707/737
2023/0334104 A1* 10/2023 Qian .................... H04L 67/535

OTHER PUBLICATIONS

Italian Search Reported dated Dec. 12, 2022 from counterpart Italian App No. IT 202200010355.

* cited by examiner

PROCESS AND SYSTEM FOR AUTOMATIC FORENSIC ACQUISITION OF WEB PAGE CONTENT

This application claims priority to Italian Patent Application 102022000010355 filed May 18, 2022, the entirety of which is incorporated by reference herein.

BACKGROUND OF THE INVENTION

This invention relates to a process and a system for the automatic forensic acquisition of data from virtual environments. In particular, the invention relates to a process and a system for the forensic acquisition of content from web pages which constitute or may constitute evidence to be used mainly, but not only, in judicial proceedings since their probative capacity after acquisition from the websites consulted can be maintained unchanged.

SUMMARY OF THE INVENTION

In almost every legal field, in consideration of the fast process of technological renewal and computerization, which foresees the implementation of increasingly fast and increasingly widespread digital communication systems, the problems linked to the context of forensic informatics are increasingly evident with respect to doctrine and jurisprudence.

The practical consequence is that it is now possible to make the case that any civil or criminal proceedings require an IT-forensic analysis.

The acquisition of online evidence is taking on an increasingly important role due also to the digitalization of business processes and the pervasive use of social networks by people and companies.

In view of the large diffusion of the virtual telematic environment, consisting mainly of the Internet, the evidence documents or the probative information must be searched for and acquired online to an ever greater extent, directly accessing the Internet and analyzing the contents of the web pages in which it is believed that these evidence documents or probative information can be found.

Moreover, the management of ever-increasing amounts of data on the Internet has inevitably also caused an increase in the number of offences perpetrated through this means, so it is increasingly urgent to define ways and tools for mitigating the impact if any type of incident occurs.

There are certainly software tools which are able to pick up data from a web page for making a forensic document which has legal validity, that is to say, a document which contains computer data and which has evidential validity in a judicial proceeding, since it allows all the parties involved to check the reliability of the data and prevent the rejection of the computer evidence.

But such tools, such as those currently used by the Computer Security Incident Response Teams (CSIRTs), which are usually effective, still require supervision by trained professionals, who cannot therefore focus on anything else while carrying out these activities. This problem is even more prevalent in the case of the acquisition of a considerable number of pieces of evidence, present on as many different web pages. Generally, given the complexity of such activities, the acquisitions are made manually.

For example, a large banking group receives thousands of reports of phishing cases daily, typically referring to pages made accessible by the Internet that simulate a user interface similar to that of the bank. Once the individual reports have been verified, it is necessary to carry out forensic acquisitions of each of these pages in order to submit the evidence to the competent authority, requiring a considerable number of man-hours.

One also needs to consider the multimedia content shared on streaming and live streaming platforms that violate copyright, or counterfeit products sold on various official and non-official marketplaces that violate brands, utility models, and patents.

The forensic acquisition of web pages often has a complexity implicit in the activity, due also to the multitude of pages connected together which make it currently difficult for a user without specific skills to perform the acquisition completely independently.

No attention will be given to the specific methods required for the creation of the forensic document as they are not related to the invention.

The attention, since it is the object of the invention, will be directed, on the other hand, to how to acquire one or more web pages to be used in a procedural context as evidence, using one or a series of algorithms for the forensic acquisition of a website.

According to the known methods, the algorithm used receives as input the web address of the Internet page from which to obtain the evidence content and, starting from this, it obtains the HTML content as well as the communications exchanged with the servers which also contain the date and the time of acquisition.

The content obtained is then processed to determine a HASH code obtaining one or more unique and unrepeatable strings which establish stable and immovable links between the website, communications with the server (headers), the content obtained and the time, forming the forensic document.

This document may therefore be used in the proceedings as probative acquisition of the content of a web page.

However, it is necessary to be able to rationally distinguish the content which may be of interest and perform a correct selection, which avoids appropriating content which has the only practical effect of hindering the easy use of content of real interest, or which even prevents the acquisition thereof.

There is therefore a need to provide tools which allow the forensic acquisition documents to be obtained in an effective and simple manner, with the minimum direct involvement of the user and on the basis of simple and unique indications.

The aim of the invention is to provide a process and a system which allows the complete automation of the process for forensic acquisition of the web pages to be actuated.

A further aim of the invention is to provide a process and a system which only require specifying the list of web pages which must be subjected to analysis and acquisition, and which then proceed in total autonomy to simulate a navigation using a browser which is able to acquire forensic evidence according to the ISO/IEC 27037:2012 standard.

Another aim of the invention is to transform the entire process for obtaining a forensic document into a user experience of simple and immediate use, therefore moving the entire complexity of the process onto the system according to the invention, but with the certainty of producing a document having the value of sound evidence.

Said aims and others are fully achieved by the process and by the system for the forensic acquisition of data from virtual environments, in particular web pages, as characterised in the appended claims.

BRIEF DESCRIPTION OF DRAWINGS

The features of the invention which do not emerge from the above are made clear in the following description, which should be considered with reference to the accompanying drawings, in which.

DESCRIPTION OF PREFERRED EMBODIMENTS

A process for the automatic forensic acquisition of the contents of one or more web pages 3 is described below with reference to the above-mentioned drawings and in accordance with the invention which does not require the continuous intervention of an experienced person, but which is implemented automatically.

Figure 1:
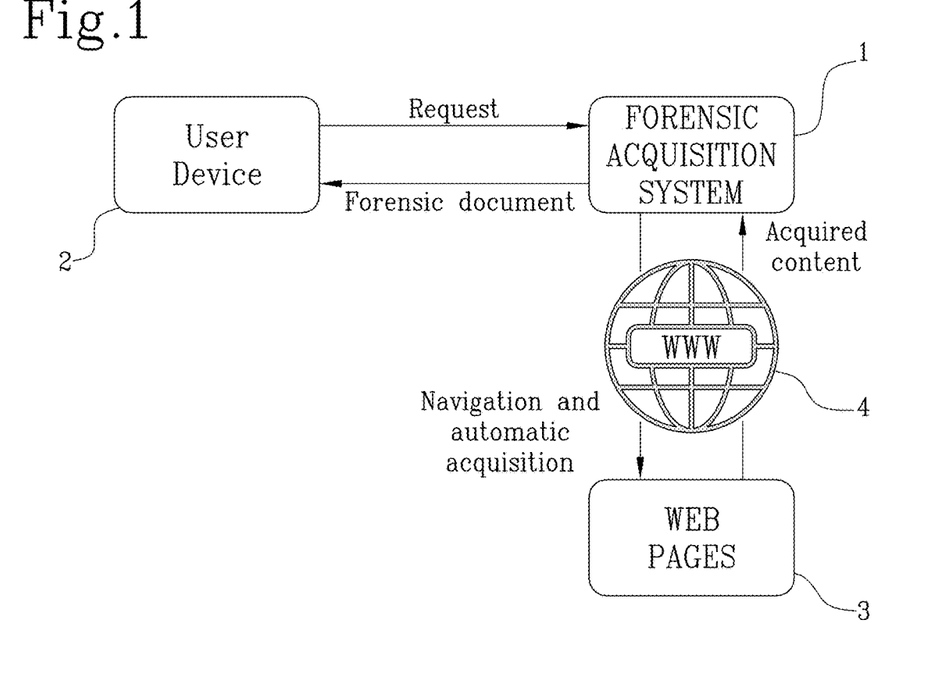
FIG. 1 represents in a simplified manner a diagram of the system in general, both as structured currently and as will be structured in accordance with the invention.

The web pages 3 to which the acquisition system 1 according to the invention is intended to access are made accessible by means of a user device 2 connected to a telecommunication network, in particular to the Internet.

It should be noted that access to another geographical or local networks other than the Internet does not affect the scope of the claims below, since access to the Internet, to which reference is generally made below, does not constitute such a limitation.

The user, using the device 2, which may be a PC, a tablet or a smartphone or other multimedia device which is able to connect to a telecommunication network and perform an exchange of information, communicates one or more URL addresses of one or more web pages 3, for which the intent is to acquire the content useful for preparing a forensic evidence document to the acquisition system 1.

The acquisition system 1 substantially comprises a computer program which may be resident on the user device, in the form of an application, or made accessible on a dedicated server, or recorded on a memory or a database 13 forming part of another physical device.

Figure 2:
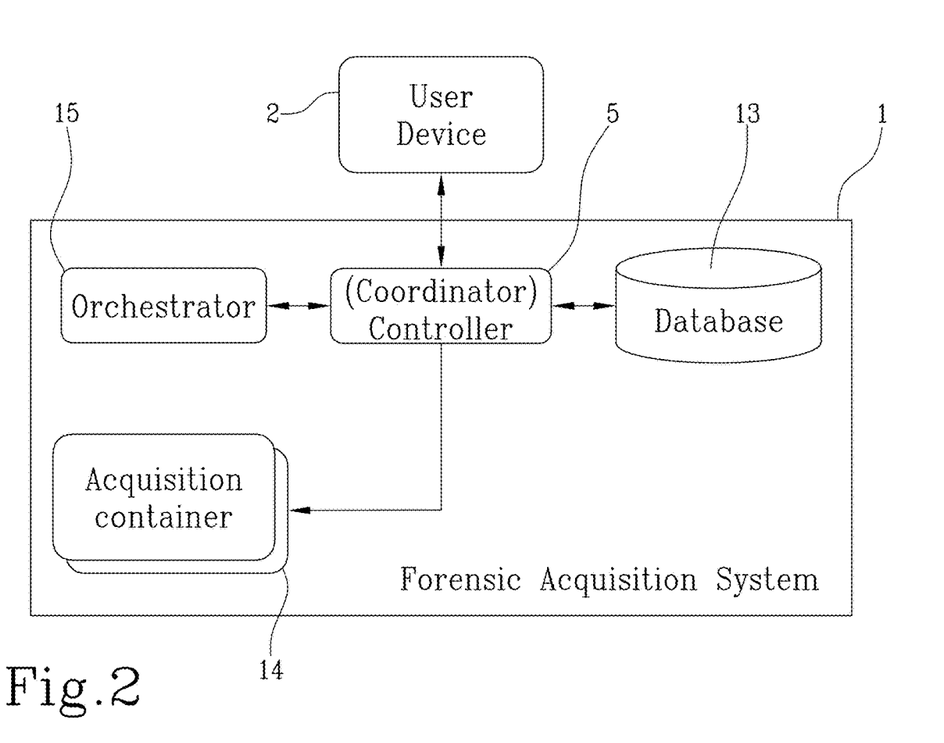
FIG. 2 specifically represents the acquisition system of FIG. 1.
Figure 3:
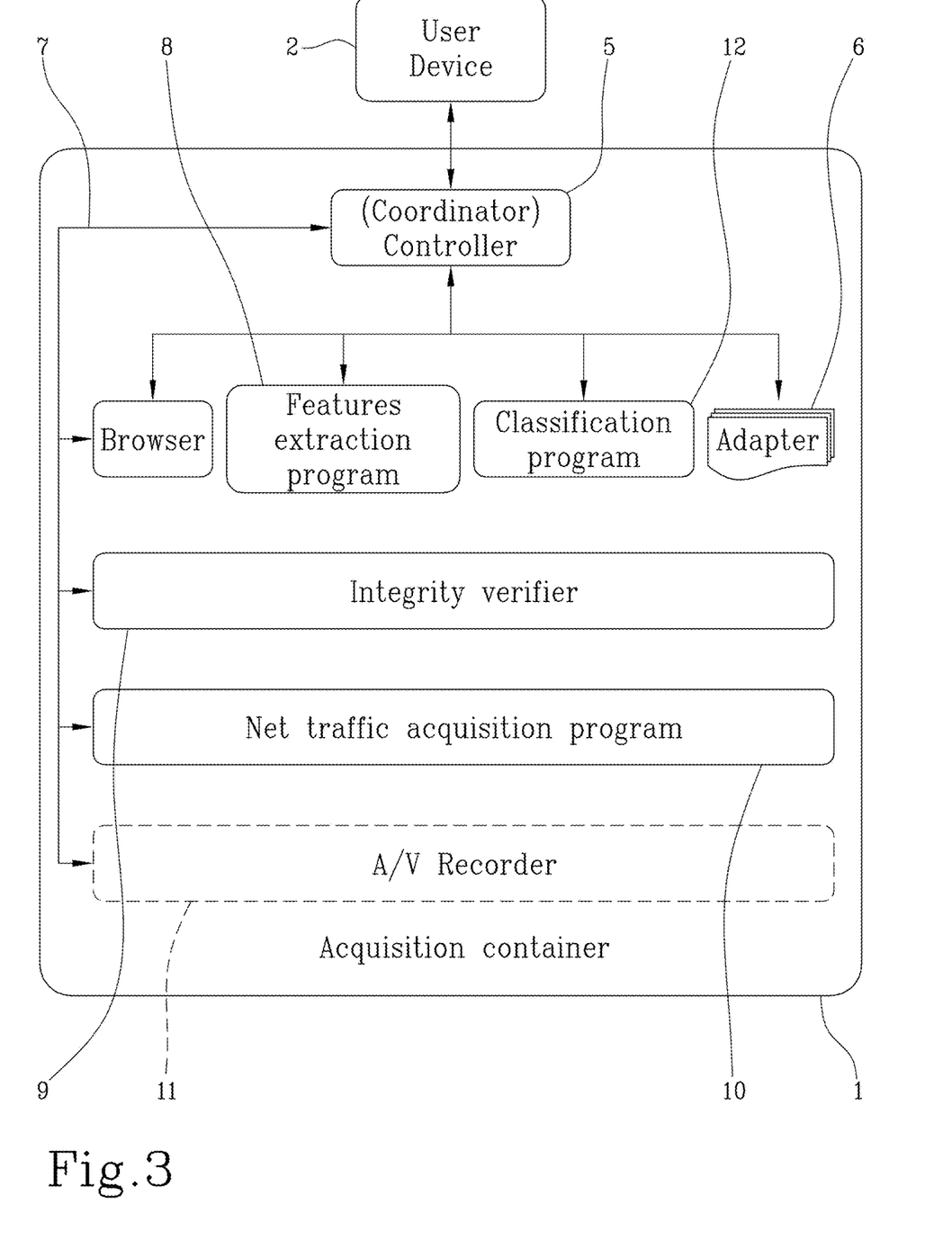
FIG. 3 illustrates the acquisition system of FIGS. 1 and 2 in an analytical form.

In the acquisition system 1 a control and coordination program 5, (controller-coordinator) manages a set of sub-processes first providing access to the telecommunication network 4 via a browser 7.

With access to the telecommunication network 4, the browser 7 picks up the network traffic as it appears from navigation, by means of a corresponding acquisition program 10, identifying the page or the pages indicated.

If the browser 7 is not run in headless mode, the audio and video output 11 as rendered by the browser 7 and by the window server may be acquired by means of A/V recording means (A/V Recorder).

Once the browser 7 has captured the network traffic at the beginning of the session and the file has been obtained containing the network traffic dump, the subsequent step of the process according to the invention comprises the creation of a list of relevant features of the type of contents of the page or pages 3 indicated, by means of suitable extraction programs 8 (feature extractor).

In order to improve the operational efficiency of the process, the extraction of the relevant features of the type of contents of the page or pages 3 indicated may be executed using artificial intelligence mechanisms.

The process then comprises the classification 12 of specific types of content of the page or pages 3 indicated, on the basis of the relevant features.

In order to allow the classification of specific types of content of the page or pages 3 indicated, the process may comprise previously performing a rendering of the page or pages 3 indicated and a dump of the network traffic decipher keys by means of the browser 7.

In practice, the types of content are classified as text pages, images, multimedia content such as videos or audio files, login pages on protected sites that require authentication, up to browsing complex pages full of advertisements, pop-ups of various types that open by surprise and, more generally, web trackers that makes it difficult to navigate.

For example, the classification program (classifier) 12 provides a preliminary (non-exhaustive) list of the classes, which may be modified dynamically or manually, to better adapt to the automatic navigation experience, comprising:

StreamingElement: Indicates the presence of elements that may lead to the playing of video content.

VideoPlayback: Indicates that videos will be played.

LoginForm: Indicates the presence of a login form.

VideoDownload: Indicates that videos can be downloaded.

ImagePost: Indicates that the main content is a post containing an image.

FileDownload: Indicates that files can be downloaded.

StaticContent: Indicates that the content is static.

Once the contents of the page or pages indicated have been classified, a selective automatic navigation is started by the acquisition system 1 of the page or pages 3 indicated, the navigation being performed on the basis of the type of classification of the page or pages 3 indicated, with the selection of specialized program codes 6 (adapters), which are selected according to the type of classification of the page or pages 3 indicated.

According to the methods known and implemented prior to this invention, the user had to be able to identify the most suitable tool to obtain the content outlined on the basis of its nature.

However, according to the invention, it is the acquisition system 1 which identifies, based on suitable tabular couplings between features detected and corresponding adapter programs, the program adapter 6 corrected each time for the content acquisition.

The adapter programs 6, under the control of controller-coordinator 5, are run in turn to create a browsing cycle which comprises:
1. extracting features,
2. classification of content,
3. application of a corresponding adapter,
4. return to point 1 or end of cycle.

The end of the cycle is determined by the execution of one of said specialized program code means or adapter 6 that is marked as the "final".

The adapters 6 provided give rise to the following list, from which they can be selected, by means of a suitable strategy for the automatic navigation process. This list (not exhaustive) can be modified dynamically or manually, to better adapt to the automatic navigation experience.

GenericStreamingElementNavigator: browses the page interacting with one or more elements resulting in video playback. A screenshot is taken at the end and the HTML is saved.

[Specific domain] StreamingElementNavigator: equal to GenericStreamingElementNavigator but for a specific domain, e.g. youtube.comStreamingElementNavigator.

GenericVideoNavigator: interacts with the playing of one or more videos by sending them forward N times until the end of the video and taking a screenshot each time. This adapter is "Final".

[Specific domain] VideoNavigator: equal to GenericVideoNavigator but for a specific domain. This adapter is "Final".

[Specific Player] VideoNavigator: equal to GenericVideoNavigator but for a specific player. This adapter is "Final".

GenericLoginNavigator: completes and send a login form. [Specific domain]LoginNavigator: equal to GenericLoginNavigator but for a specific domain.

VideoDownloader: executes the full download of videos available in the Page. This adapter is "Final".

ScrollScreenshotNavigator: scrolls the page and then makes a screenshot and downloads the HTML code. This adapter is "Final".

GenericFileDownloader: downloads files available on the page. This adapter is "Final".

[Specific domain]FileDownloader: equal to GenericFileDownloader but for a specific domain. This adapter is "Final".

After the adapters 6 selected have selectively acquired the content from the page(s) 3 indicated, according to the classification, and that the content has been stored in an acquisition container 14, the acquisition system 1 automatically creates and returns to the user a forensic evidence document and concludes the forensic acquisition.

The forensic evidence document may consist of logs of various types, encrypted network traffic decipher keys, network traffic dumps, source code and screenshot of each page, any file automatically downloaded, any output of the A/V recorder, any dumps of the image of the acquisition container at the end of the session, files containing fingerprints of individuals file mentioned above to which a qualified timestamp and an automatic digital signature will be applied. The document may also be accompanied by a methodological report which is also produced automatically.

The control and coordination program 5 in its interaction with the user using the user device 2 receives as input the URL addresses to be transferred to the acquisition system 1 together with any other potential relevant information required by adapter 6, such as, for example, username and password to perform the login on the pages protected by authentication.

At the end of the forensic acquisition session, the control and coordination program 5 returns the forensic document to the user, by means of the user device 2.

According to the process according to the invention, a continuous check 9 is performed on the integrity of the application components being run.

The process described above may be implemented by means of a system 1 for the forensic acquisition of the contents of one or more web pages 3 which comprises a series of programs, which can be allocated on a memory section of a user device 2, or on a web server or on another device accessible to the user device 2.

As mentioned, the user device 2 generally consists of a PC, although it may comprise a tablet or a smartphone, or another electronic device which is able to connect to a geographical or local telecommunication network, and interact with the latter for an exchange of data.

The acquisition system 1 therefore comprises coordination and control program means 5 (controller-coordinator) for coordinating the operation of the various application components and to constitute a communication bridge towards the user device 2.

The acquisition system 1 also comprises a database 13 for temporarily storing file of the pages consulted and the content subsequently acquired.

A further essential application component of the acquisition system 1 consists of a browser 7, which is used to perform the rendering of the page or pages 3 indicated and the dump of the decryption keys of the network traffic involved, or, if necessary, to acquire audio and video output 11 as rendered by the browser 7 and by the window server.

There are also automatic extraction means 8 (feature extractor) which, acting on the result of the capture of the network traffic by the browser 7 and of the file containing the network traffic dump, produce a list of relevant features of the contents of the page or pages 3 of which the address has been stored in said acquisition system 1 by the user.

The classification 12 of specific types of content of the page or pages 3 indicated is carried out by classification means 12 (classifier) which operate on the basis of the relevant characteristics and the network traffic dump.

Specialized program code means 6 (adapters) are provided to carry out selective automatic navigation of the page or pages 3 indicated. Such adapters 6 are selected each time by the controller-coordinator 5 according to the type of classification identified by classification means 12 (classifier).

The adapters 6 selectively acquire the forensic content as a function of the classification from the page or from the pages 3 indicated.

In practice, these specialized code means 6 emulate human navigation actions on the basis of the type of page associated with them each time, as identified by the classifier 12, forming the browsing cycle, as mentioned above.

The adapters 6 also have the responsibility of generating the source code and the screenshot for each page. There are various types of adapters 6, which may vary, for example, from static pages, to pages containing multimedia content, to the management of logins on protected sites which require authentication, up to browsing complex pages rich in advertising, pop-ups of various types and, more generally, web trackers that makes it difficult to navigate.

Among the adapters 6 there is also an adapter labelled as "Final", which then results in the end of a browsing cycle. In other words, no other adapter 6 may be applied after this one.

Lastly, the acquisition device 1 also comprises program means for automatically creating and returning to the user a forensic evidence document, after completing the cycle for acquiring the contents of the page or pages indicated, and for completing the forensic acquisition session.

There may also be a program resident on the acquisition system 1 the purpose of which is to constantly check the integrity of the other components being executed, that is to say, a integrity verifier 9 which executes a continuous integrity check.

This verification program signals to the controller any integrity problem found on one or more of the application components being executed.

The various application components, for a greater compactness of the acquisition system 1 and a better management of the forensic acquisition requests from the URLs indicated, may be allocated in an acquisition container 14 provided in the acquisition system 1 and consisting of a memory section.

Again with the aim of improving the fluidity of the application cycles of the acquisition system, there may be a coordination component (Orchestrator) 15, with the function of managing the life cycle of the Acquisition Containers 14.

For implementing the process described above on the acquisition device 1, there is also an general computer program comprising the steps which implement the steps of the process described above.

Figure 4:
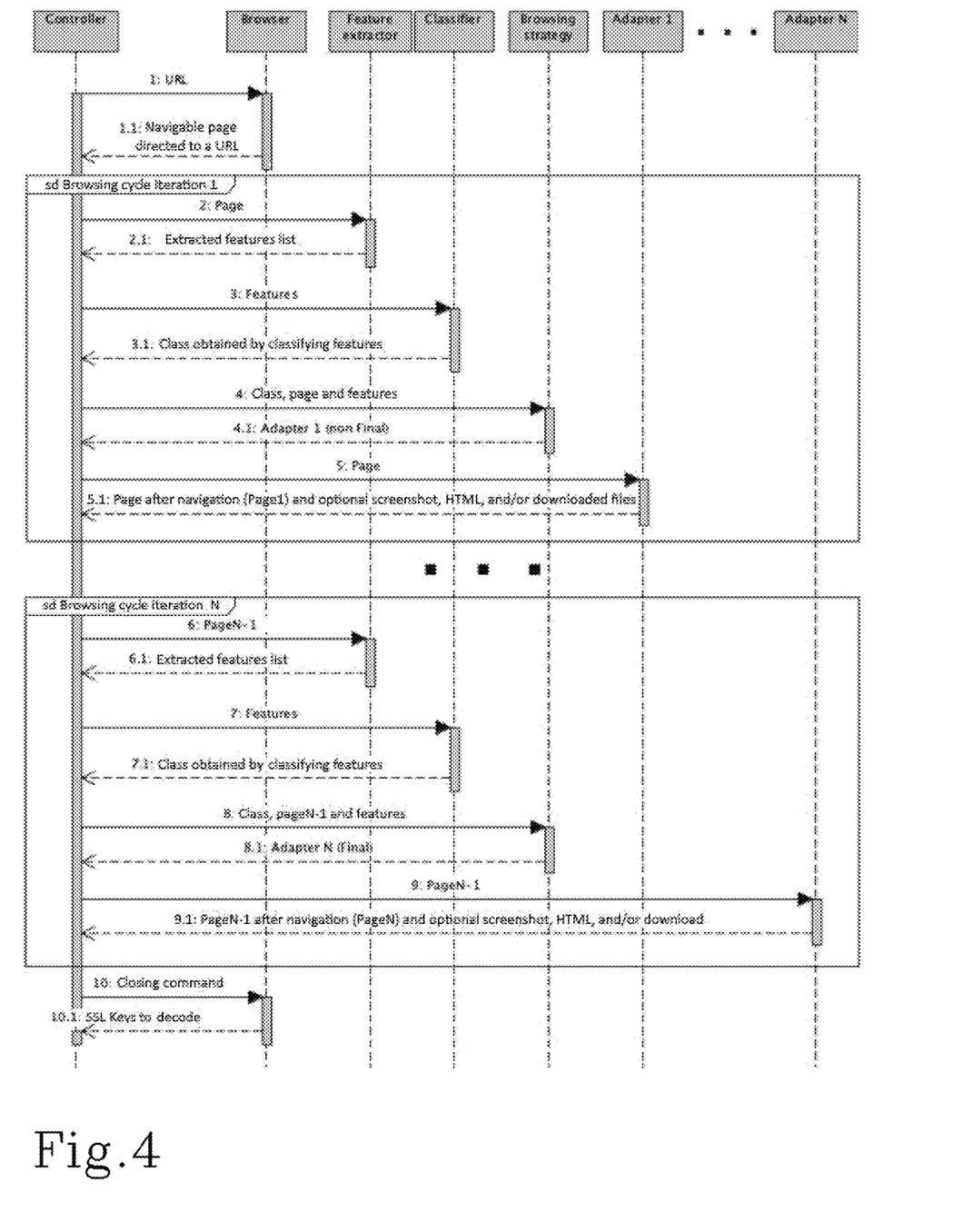
FIGS. 4 to 5 illustrate the application sequence of the process according to the invention, and of the computer program which is able to implement it in as many real examples which can be found on the Internet.

FIG. 4 shows a functional diagram of the process according to the invention in a relative practical application, referred to a web generic page.

Figure 5:
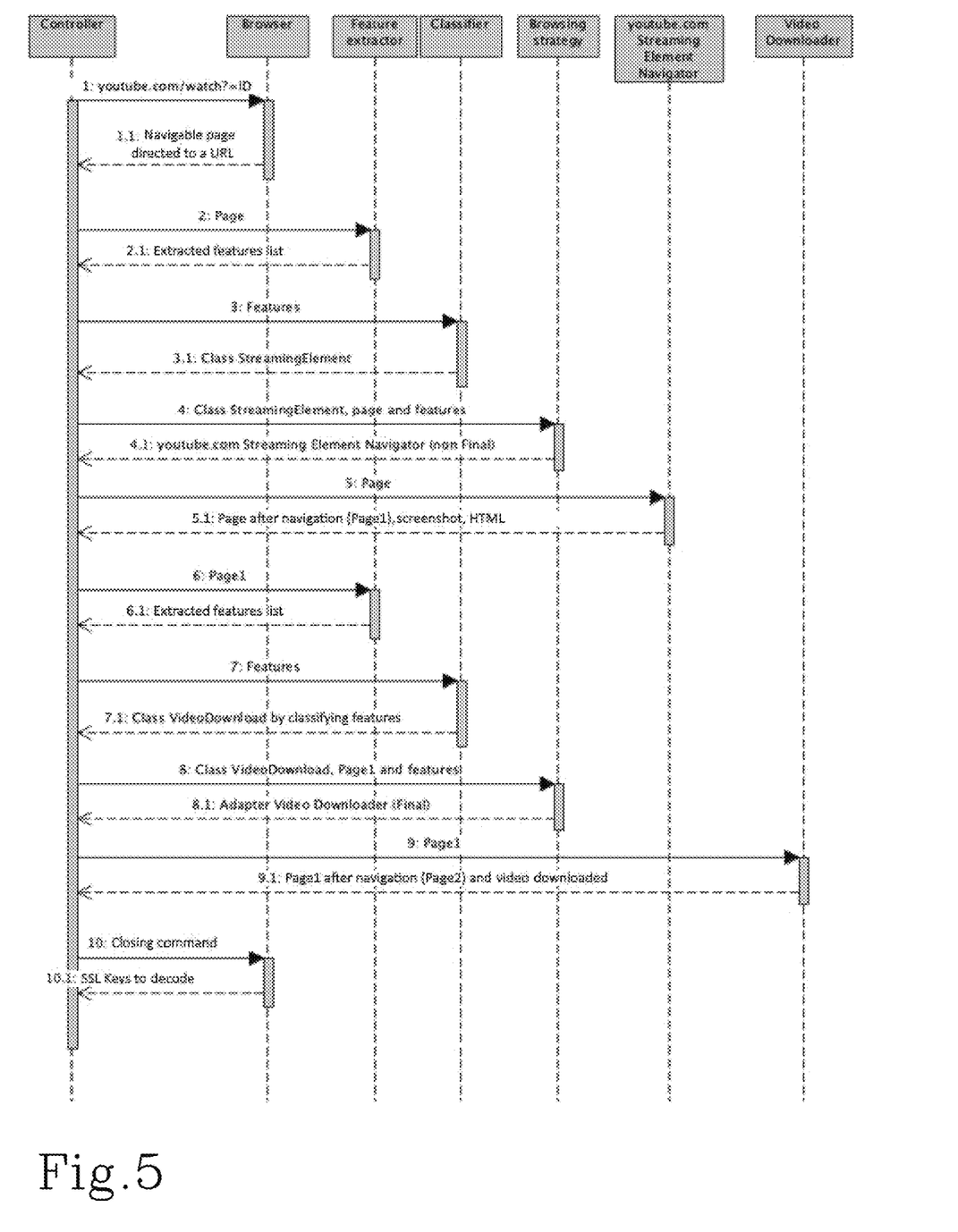

FIG. 5 shows the same functional diagram of an application example but specifically referred to a page of youtube.com.

The process and the system according to the invention propose an innovative navigation automation strategy, integrating artificial intelligence techniques, such as automatic feature extraction and machine learning, plus a knowledge of the domain defined ontologically.

In this way, it is possible to obtain a structured information inside the Classifier component regarding the pages consulted and their type of content. This information is used by the controller 5 which, using a suitable Browsing Strategy, decides which Adapter to use at a given time in the Browsing cycle.

The adapters 6 are atomic navigation components that are registered in a fully dynamic manner in the controller and are associated with specific types of content (Classes), registered in a Browsing Strategy.

All of this allows the forensic acquisition to be performed completely automatically, without the need for particular experience or preparation by the user.

As may be inferred from what is described above, the process and the system according to the invention are very simple but effective. Any user can use such a service without having any knowledge of forensic computing or without having to spend a significant amount of time manually navigating the pages one by one.

The preset aims are fully achieved in this way.

What is claimed is:

1. A process for automatic forensic acquisition of content of one or more web pages accessible via a user device accessing a telecommunications network, by which a user interacts on said telecommunications network, comprising the following steps:
   - communicating by said user to a control and coordination program, through a user device, one or more URL addresses of one or more web pages for which it is intended to acquire content useful for preparing a forensic evidence document;
   - accessing said telecommunications network via a browser and generating a list of relevant features of a type of content of the indicated page or pages;
   - classifying specific types of content of the indicated page or pages based on said relevant features;
   - selectively automatically navigating to the indicated page or pages, based on the type of classification of the indicated page or pages;
   - selectively acquiring the content from the indicated page or pages, in accordance with said classification;
   - automatically creating and returning to the user a forensic evidence document and concluding the forensic acquisition;
   - wherein the selective acquiring step is carried out by selecting specialized program codes according to the type of classification of the indicated page or pages and executing in turn to give rise to a browsing cycle;
   - selecting specialized program codes according to the type of classification of the indicated page or pages to provide output data in the form of source code, or screenshots, or multimedia content and to implement login management on protected sites requiring an authentication procedure and to perform browsing on complex pages with advertising messages, pop-ups and web trackers;
   - selectively acquiring with the specialized program codes the forensic content as a function of the classification from the indicated page or pages;
   - emulating human navigation actions with the specialized program codes based on the type of indicated page or pages associated with them each time, as identified by the classification, forming the browsing cycle;
   - generating the source code and the screenshot for each page with the specialized program codes;
   - including a final specialized program code with the specialized program code that causes an end to the browsing cycle such that no other ones of said specialized program codes may be applied after said final specialized program code;
   - terminating the browsing cycle by executing said final specialized program code.

2. The process according to claim 1, wherein the selection of said specialized program codes according to the type of classification of the indicated page or pages is each time performed by said control and coordination program.

3. The process according to claim 1, and further comprising a coordination step for coordinating various steps by said control and coordination program that coordinates the various application components and serves as a communication bridge to said user device.

4. The process according to claim 1, wherein a rendering of said indicated page or pages and a dump of network traffic decryption keys are performed by said browser to enable classification of specific types of content of the indicated page or pages.

5. The process according to claim 1, wherein relevant features of the type of content of the indicated page or pages are extracted by a program for extraction of said features.

6. The process according to claim 5, wherein extracting said relevant features of the content type of the indicated page or pages is performed by using artificial intelligence mechanisms.

7. The process according to claim 1, wherein accessing said telecommunication network via said browser comprises acquiring network traffic as the network traffic appears from browsing via a corresponding acquiring program.

8. The process according to claim 1, wherein a continuous verification is provided about an integrity of the running application components.

9. The process according to claim 1, wherein capturing audio and video output as rendered by the browser and the window server is performed, if the browser is not running in headless mode.

10. An acquisition system for the automatic forensic acquisition of the content of one or more web pages, operating over a telecommunications network by a user device accessing said telecommunications network and suitable for enabling a user to perform interactions over said telecommunications network, said acquisition system comprising:

a control and coordination program, residing in said acquisition system, suitable for coordinating the operation of the various application components and providing a communication bridge to said user device;

a browser used to provide a rendering of the indicated page or pages and the dump of the decryption keys of the network traffic involved;

an automatic extraction program for extraction of a list of relevant features of the contents of the indicated page or pages of which the URL address is stored in said acquisition system;

a classification program for classification of specific types of content of the indicated page or pages on the basis of said relevant features and of the dump obtained by said browser;

specialized program codes for performing at least selective automatic browsing of the indicated page or pages each time on the basis of the type of classification identified by said identification and classification means, also suitable for selectively acquiring the forensic content on the basis of said classification from the indicated page or pages; the specialized program codes configured to perform as follows:

carrying out the selective acquiring step by the specialized program codes selected according to the type of classification of the indicated page or pages and executing in turn to give rise to a browsing cycle;

selecting specialized program codes according to the type of classification of the indicated page or pages to provide output data in the form of source code, or screenshots, or multimedia content and to implement login management on protected sites requiring an authentication procedure and to perform browsing on complex pages with advertising messages, pop-ups and web trackers;

selectively acquiring with the specialized program codes acquiring the forensic content as a function of the classification from the indicated page or pages;

emulating human navigation actions with the specialized program codes based on the type of indicated page or pages associated with them each time, as identified by the classification, forming the browsing cycle;

generating the source code and the screenshot for each page with the specialized program codes;

including a final specialized program code with the specialized program codes that causes an end to the browsing cycle such that no other ones of said specialized program codes may be applied after said final specialized program code;

terminating the browsing cycle by executing said final specialized program code;

an automatic creation program for automatic creation and return to the user of a forensic evidence document by said acquisition system and conclusion of the forensic acquisition.

11. A non-transitory computer program suitable for being made operational in an acquisition system, comprising computer-readable instructions which, when executed by the application components of said acquisition system, comprising the following steps:

communication by said user through the user device, of the one or more URL addresses of the one or more web pages for which it is intended to acquire content useful for the preparation of a forensic evidence document;

access to said telecommunications network via the browser and generation of the list of relevant features of the type of content of the indicated page or pages;

classification of specific types of content of the indicated page or pages on the basis of said relevant features;

wherein, specialized program codes are provided for performing:

selective automatic navigation of the indicated page or pages based on the relevant type of classification;

selective acquisition of the content from the indicated page or pages by said acquisition system, in accordance with said classification of the indicated page or pages and executed in turn to give rise to a browsing cycle;

wherein said selecting specialized program codes according to the type of classification of the indicated page or pages to provide output data in the form of source code, or screenshots, or multimedia content and to implement login management on protected sites requiring an authentication procedure and to perform browsing on complex pages with advertising messages, pop-ups and web trackers;

selectively acquiring the forensic content as a function of the classification from the indicated page or pages;

emulating human navigation actions with the specialized program codes based on the type of indicated page or pages associated with them each time, as identified by the classification, forming the browsing cycle;

generating the source code and the screenshot for each page with the specialized program codes;

including a final specialized program code with the specialized program codes that causes an end to the browsing cycle such that no other ones of said specialized program codes may be applied after said final specialized program code;

terminating the browsing cycle by executing said final specialized program code; and automatic creation and return to the user of a forensic evidence document and conclusion of the forensic acquisition.

12. The computer program according to claim 11, wherein a rendering of said indicated page or pages and a dump of the network traffic decryption keys are performed by said browser to enable classification of specific types of content of the indicated page or pages.

13. The computer program according to claim 11, wherein extracting said relevant features of the content type of the indicated page or pages is performed by using artificial intelligence mechanisms.

14. The computer program according to claim 11, wherein a continuous verification is executed about an integrity of the running application components.

15. The computer program according to claim 11, wherein capturing audio and video output as rendered by the browser and the window server is performed, if the browser is not running in headless mode.

* * * * *